May 19, 1970  P. L. AARON  3,512,445
AUDIBLE AND VISUAL MUSICAL TEACHING DEVICE
Filed Feb. 5, 1968  2 Sheets-Sheet 1

INVENTOR
PHILLIP L. AARON

BY  *Alvin Browdy*

ATTORNEY

May 19, 1970      P. L. AARON      3,512,445

AUDIBLE AND VISUAL MUSICAL TEACHING DEVICE

Filed Feb. 5, 1968      2 Sheets-Sheet 2

INVENTOR
PHILLIP L. AARON

BY *Alvin Browdy*

ATTORNEY

United States Patent Office 3,512,445
Patented May 19, 1970

3,512,445
AUDIBLE AND VISUAL MUSICAL TEACHING DEVICE
Phillip L. Aaron, 2916 N. 29th St., Milwaukee, Wis. 53210
Filed Feb. 5, 1968, Ser. No. 703,122
Int. Cl. G09b 15/02
U.S. Cl. 84—471                                8 Claims

ABSTRACT OF THE DISCLOSURE

A device for teaching music having a keyboard representation and movable key blocks to represent notes, and a tone generator actuated by the key block to generate a tone of a frequency corresponding to the position of the key block; movement of the key block in a selected position completes a circuit to a tone generator, such as an oscillator.

CROSS REFERENCE TO RELATED PATENT

The present invention is an improvement over the invention described in Aaron Pat. No. 3,130,627.

BACKGROUND OF THE INVENTION

The present invention is a device for teaching musical notation and transposition by providing a visual representation of a keyboard and related notes and a corresponding audible tone.

The prior art has provided teaching devices of this general nature, in one instance having a pointer to actuate sound sources electronically and to simultaneously give a visual representation of the notation. In another device, buttons were used to illustrate a note and energize a corresponding sound source.

SUMMARY OF THE INVENTION

The present invention has for its object to provide an improved musical teaching device which is of simple, economical and durable construction, and which will effectively provide a readily understood graphical representation of musical notation and simultaneously produce a corresponding tone. Another and related object is to provide a device of this nature which will permit flexibility in the arrangement of notes to be displayed and sounded.

There is provided a plate having a keyboard representation adjacent a window, with movable key blocks, carrying note designations, visible and accessible through the window. The key blocks may be moved laterally to relate them to desired keys of the keyboard representation, and may be depressed to actuate sounding elements of frequencies respectively corresponding to the keyboard keys. Specifically, depressing a key block completes a circuit to an oscillator having a corresponding frequency.

DESCRIPTION OF THE PREFERRED EMBODIMENT

Figure 1:
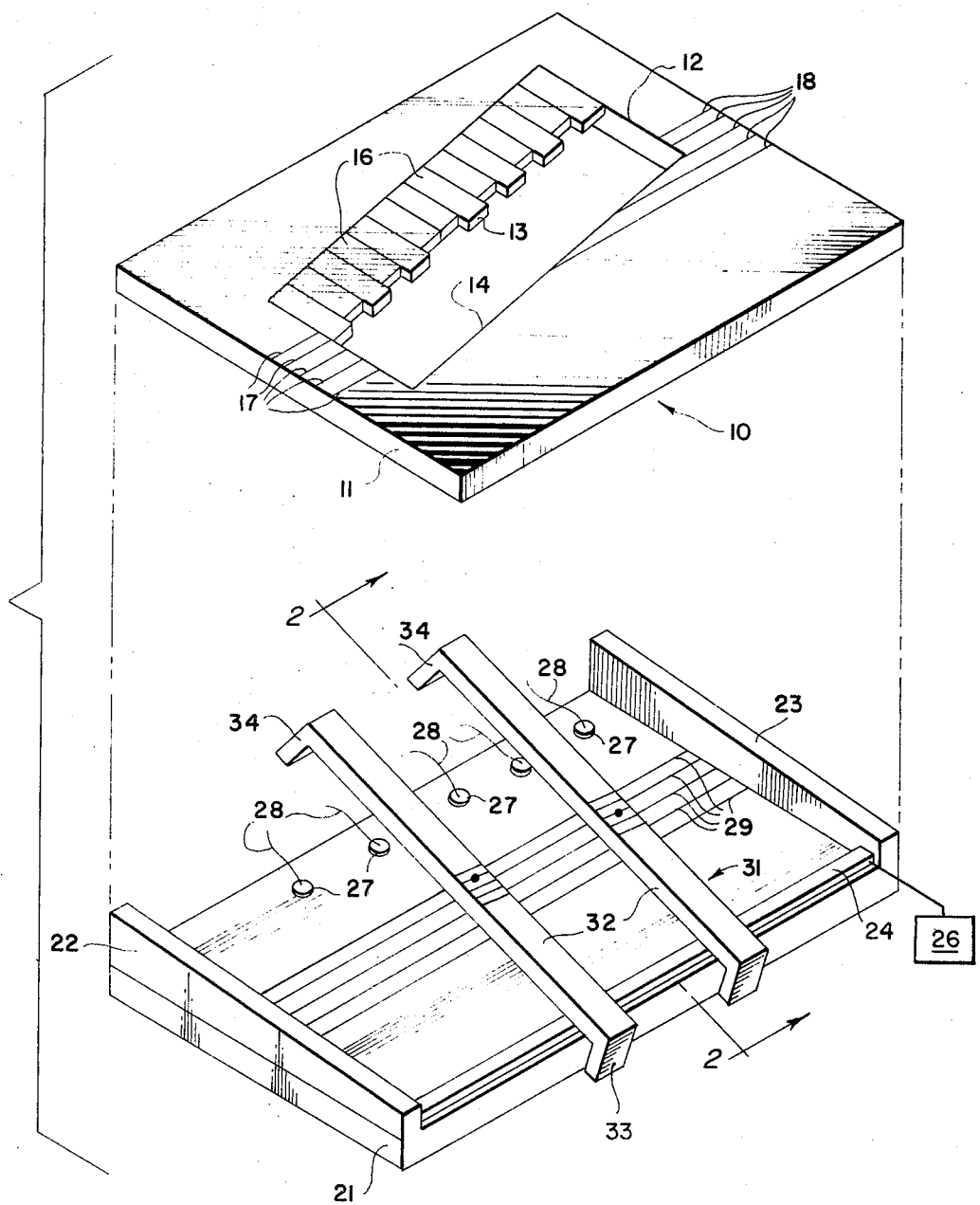
FIG. 1 is a perspective, exploded view of the mechanical parts of the invention.

Referring now to the drawing, there is shown in FIG. 1 certain parts of the musical teaching device generally designated 10. There is provided a face plate 11 having a rhomboidal window 12 therein. The upper margin 13 and lower margin 14 of the window 12 are inclined upwardly from left to right, and adjacent upper margin 13 is a representation 16 of a segment of piano keyboard containing both black and white keys. Face plate 11 is also provided near its left and right margins with aligned musical staff lines 17 and 18.

The face plate 11 is mounted upon a base 21, and more particularly on wedges 22 and 23 positioned at either end of the base plate 21. Consequently, it will be seen that in assembled relation, face plate 11 is held at an angle to the main portion of base plate 21.

There is provided on the upper surface of base plate 21 a conductor 24 which is connected with a current source 26. Near the side opposite to that which conductor 24 is adjacent are a plurality of contacts 27, to each of which there is connected a connecting wire 28. There may be provided, in addition, on the upper surface of base plate 21 a plurality of staff lines 29.

A plurality of key blocks 31 are provided, each having a longitudinally extending body portion 32 and a pair of downwardly extending feet 33 and 34. Each key block 31 may also be provided with staff lines and note representations, as clearly shown in FIG. 1. Spacing of the feet 33 and 34 is such as to enable the key blocks 31 to slide laterally across base plate 21.

Figure 2:
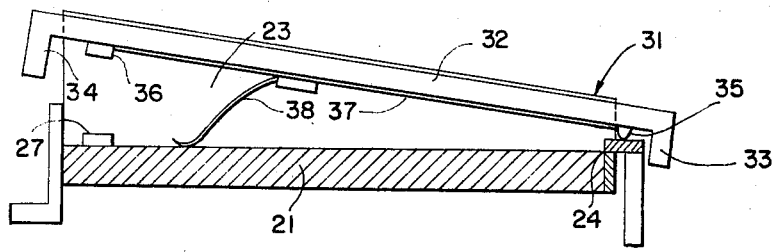
FIG. 2 is a cross sectional view taken on the line 2—2 of FIG. 1.

Referring now to FIG. 2, there may be seen the base plate 21 with wedge 23, together with a key block 31, including the feet 33 and 34 thereof. There may also be seen the conductor 24 and one of the contacts 27 on the base plate 21. The key block 31 may be seen to carry on the underneath side thereof a contact 35 which is always in engagement with conductor 24. Adjacent the foot 34 there is a second contact 36 carried on the underside of key block 31, and electrically connected to contact 35 by a conductor 37. The contact 36 is positioned to engage the contact 27 when the key block 31 is as viewed in FIG. 2. A leaf spring 38 may be provided, attached to the underside of the body 32 of key block 31 and in sliding relationship with the upper surface of base plate 21. As will be apparent, key block 31 may be depressed to complete a circuit from conductor 24 to contact 27, and upon release the circuit will be broken because of the return of key block 31 to the position shown in FIG. 2 by action of spring 38.

Figure 3:
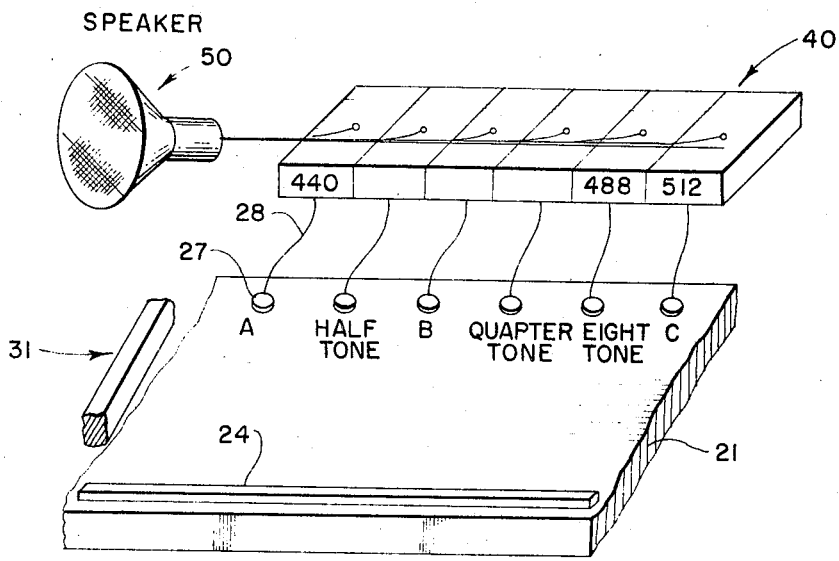
FIG. 3 is a perspective view illustrating additional elements of the invention.

Referring now to FIG. 3, there is shown in perspective a portion of the teaching device as shown in FIGS. 1 and 2, together with additional components. In FIG. 3, there may be seen the base plate 21, with parts broken away and including a portion of the conductor 24. There may also be seen a number of the contacts 27 and connecting wires 28. Also visible in FIG. 3 is a portion of a key block 31.

By way of example, the scale has been expanded to provide a larger number than usual of intermediate notes or tones between the normal notes or tones. For example, there are shown on FIG. 3 contacts 27 designated A, half tone, B, quarter tone, eighth tone and C. Each of these contacts is connected by a connecting wire with tone generating means 40, which may be connected with a speaker 50. The tone generator 40 may provide circuit means for generating frequencies as indicated, and which are now established as the frequency, respectively, of each of the notes or tones as indicated. Typically, the tone generator 40 may include oscillator circuit means of known configuration so that when the contact 27 which is designated A is engaged, a circuit is completed through it and through at least a portion of tone generator 40 to generate a tone having a frequency of 440 cycles per second.

It will be understood that other arrangements may be utilized, as for example, a number of tuning forks each having the corresponding frequency, together with means to actuate the tuning fork upon completion of a particular circuit; this may take the form of a solenoid-operated hammer for striking a desired tuning fork.

It will be understood that not all of the intermediate tonal variations are necessarily employed, but that a fewer number of tones may be employed, as indicated by the base plate of FIG. 1. On the other hand, in embodiments where it is desired to utilize the intermediate tonal sounds as indicated in FIG. 3, then the face plate 11, and in particular the representation 16, will be varied to conform.

The use of the present invention will be readily understood from the foregoing description, and from a consideration of Pat. No. 3,130,627. In brief, one or more key blocks 31 may be moved laterally into a desired position or positions, thereby visually indicating a note or pattern of notes, and then the key block or blocks is depressed either in sequence or simultaneously, to provide corresponding audible tones of predetermined frequencies. The staff lines on the key block will give a vivid visual representation of a note position, corresponding to the sheet music notation, when viewed in relation to the staff lines 17, 18 and 29, and to the key representations 16. Hence there is direct visual display between sheet music and keyboard representation. Depression of the key will cause generation of a tone signal, for example the note A, thus adding the impact of the sound to the intellect of the student. Hence, the student readily grasps the relationship between scale position notation and tone. To teach the concept of transposition, resulting from sharp or flat notation, the key block is moved laterally and then depressed at the new location to thereby cause the sounding of the tone signal for the note A sharped or flatted, as the case may be. This provides the student with both visible representation and audible tone sensing of the concept of transposition.

There has been provided a teaching device for music which is economical to manufacture of readily available parts, and which will provide to the student both a visual and audible indication of a note or of a pattern of notes. The present teaching device is readily operated, and its functioning will be readily understood by a student.

It will be obvious to those skilled in the art that various changes may be made without departing from the spirit of the invention and therefore the invention is not limited to what is shown in the drawings and described in the specification.

I claim:
1. A teaching device for music comprising
   a display comprising a face plate having a window therein, a representation of a plurality of piano keys adjacent a margin of said window,
   a key block,
   means supporting said key block for sliding movement beneath and transversely of said window and for movement away from said face plate,
   and means responsive to movement of said key block away from said face plate for generating a tone having a frequency corresponding to the frequency of that piano key representation in juxtaposition to which said key block is positioned.

2. A teaching device as set forth in claim 1, said key block comprising first and second contacts on said key block joined by a connector, said device further comprising a conductor strip with which one of said contacts is in engagement, and contact means in juxtaposition with each said key representation and positioned for engagement by said second contact on said key block.

3. A teaching device as set forth in claim 2, said contact means comprising a plurality of contacts.

4. A teaching device as set forth in claim 3, said tone generating means further comprising means connected with each of said last mentioned contacts for generating a distinct frequency.

5. A teaching device as set forth in claim 4, said last mentioned means having a speaker connected thereto.

6. A teaching device as set forth in claim 2, and further comprising means for pivotally mounting said key block for pivotal movement in a plane perpendicular to the plane of said window, said contact means being further from said face plate than said conductor strip, whereby said key block second contact engages said contact means upon pivotal movement of said key block.

7. A teaching device as set forth in claim 6, said conductor strip and said contact means being carried by a base plate underlying said face plate.

8. A teaching device as set forth in claim 7, said key block comprising a body overlying said base plate and a pair of feet at either end of said body extending past marginal edges of said base plate.

References Cited

UNITED STATES PATENTS

| | | | |
|---|---|---|---|
| 347,686 | 8/1886 | Carpenter et al. | 84—473 |
| 1,400,947 | 12/1921 | Fennell | 84—478 |
| 3,130,627 | 4/1964 | Aaron | 84—471 |
| 3,256,765 | 6/1966 | Siegel | 84—478 |
| 3,382,750 | 5/1968 | Hiyama | 84—471 |

RICHARD B. WILKINSON, Primary Examiner

J. F. GONZALES, Assistant Examiner

U.S. Cl. X.R.

84—473